United States Patent [19]

Noland et al.

[11] 4,397,266
[45] Aug. 9, 1983

[54] FREEZE PROTECTED LIVESTOCK WATERING DEVICE

[76] Inventors: Wayne B. Noland, 340 Crescent Dr.; Larry F. Noland, 5645 SE. Maple Dr., both of Carlisle, Iowa 50047

[21] Appl. No.: 232,302

[22] Filed: Jun. 22, 1981

Related U.S. Application Data

[63] Continuation of Ser. No. 82,146, Oct. 5, 1979, abandoned.

[51] Int. Cl.³ ............................................. A01K 7/06
[52] U.S. Cl. ......................................... 119/73; 119/75
[58] Field of Search .................... 119/73, 75; 137/443

[56] References Cited

U.S. PATENT DOCUMENTS

| | | | |
|---|---|---|---|
| 2,479,355 | 8/1949 | Hemker | 119/73 |
| 2,512,510 | 6/1950 | Wartes | 119/73 |
| 2,764,960 | 10/1956 | Ferris | 119/75 |
| 3,324,834 | 6/1967 | McKinstry | 119/73 X |
| 3,412,712 | 11/1968 | Taylor | 119/75 |

FOREIGN PATENT DOCUMENTS

| | | | |
|---|---|---|---|
| 606167 | 7/1960 | Italy | 137/443 |
| 13469 | 2/1901 | Sweden | 119/75 |
| 327035 | 3/1930 | United Kingdom | 119/75 |

*Primary Examiner*—Hugh R. Chamblee
*Attorney, Agent, or Firm*—Henderson & Sturm

[57] ABSTRACT

This invention relates to freeze protected livestock watering assemblies in general, and more specifically to a watering device, which incorporates a dual activated variable flow water supply valve structure, which is operatively connected to an apertured float arm to progressively increase the volume of water supplied to a drinking receptacle in proportion to the degree of depression of the float arm actuator.

15 Claims, 3 Drawing Figures

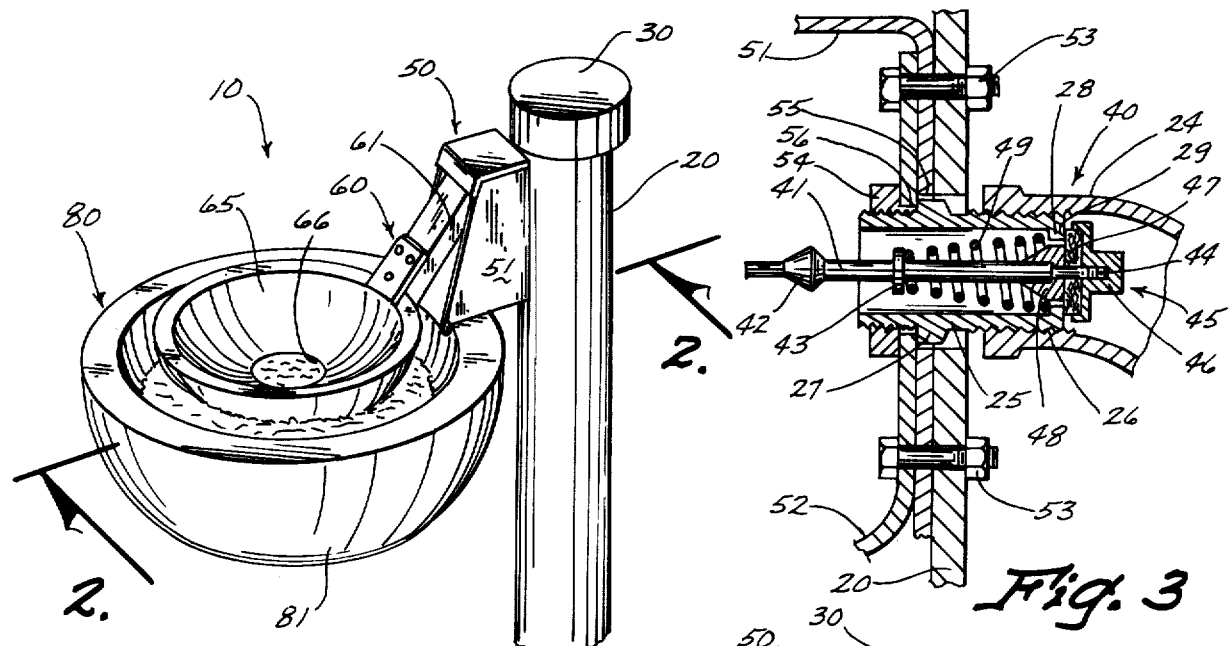
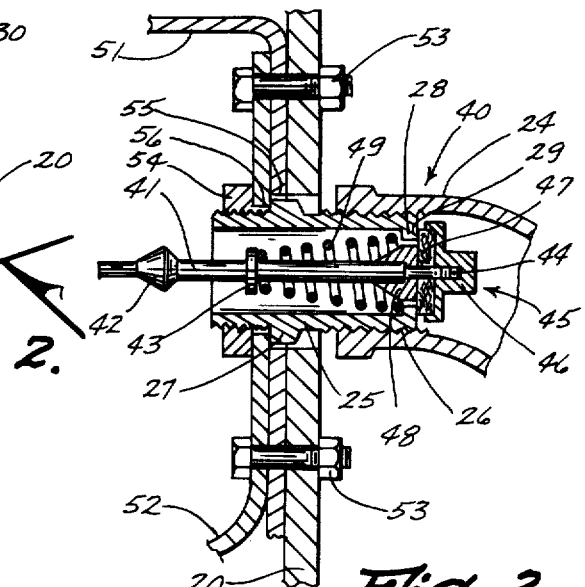
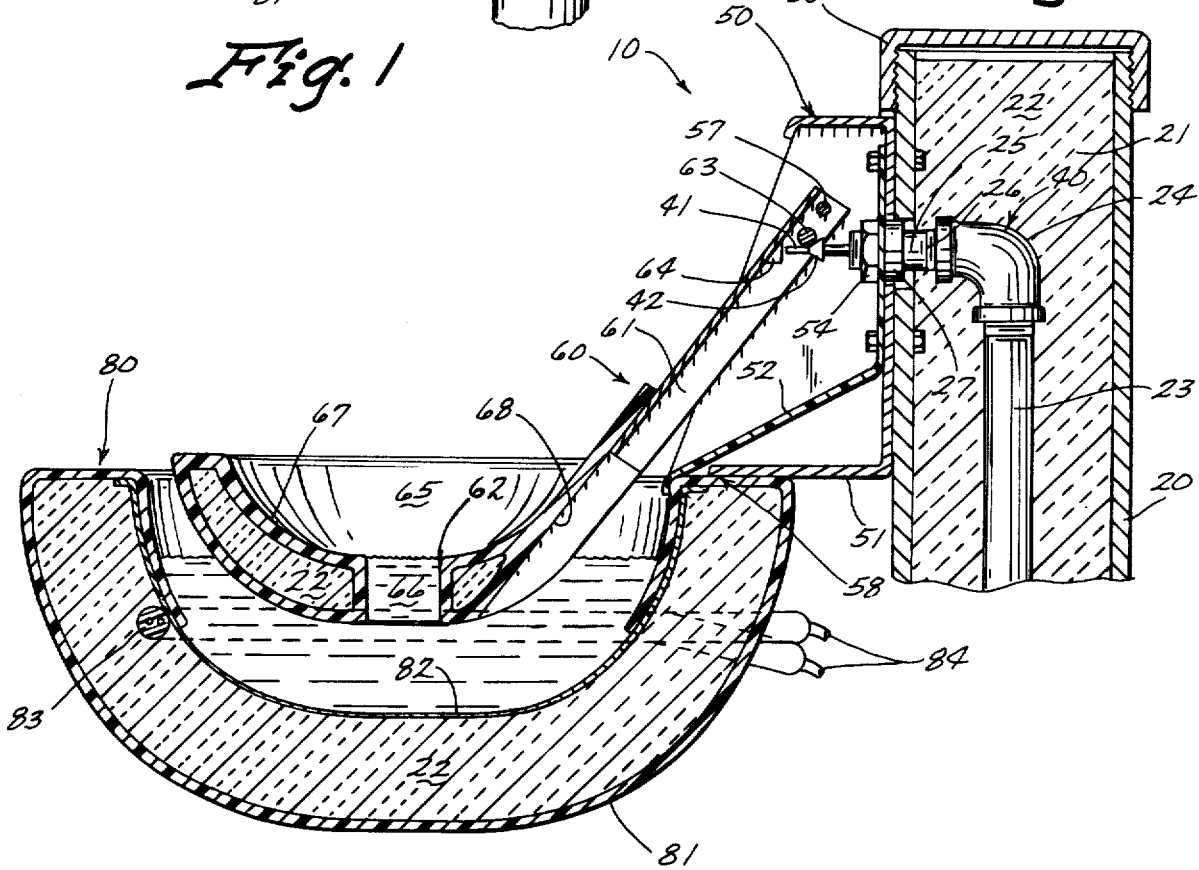

4,397,266

FREEZE PROTECTED LIVESTOCK WATERING DEVICE

This is a continuation, of application Ser. No. 082,146 filed on Oct. 5, 1979, now abandoned.

BACKGROUND OF THE INVENTION

In severe climates where subfreezing temperatures occur over prolonged periods of time, water pipes and water troughs must be protected from freezing in order to allow access by livestock to a readily available and replenishable water supply. There have been many prior art devices which have dealt with maintaining the supply pipes and/or the drinking receptacle ice free. The inventor of the instant device was himself granted U.S. Pat. Nos. 4,091,261 and 4,069,409 which were directed towards maintaining the water supply pipes to a livestock watering assembly ice free.

Some of the problems associated with the prior art devices have been: an inability to regulate the flow to the trough or receptacle in response to the demand of the livestock; the use of complex heating elements which transferred too much heat to either the supply pipe or receptacle resulting in warm water which the animals are reluctant to drink, or a hot receptacle surface which would burn the animals muzzle and discourage them from utilizing the trough; improper insulation on the heating element, resulting in electrical current being passed through the receptacle and shocking the livestock upon contact, thereby causing them to completely avoid the watering trough; and improper placement of the heating element with respect to the supply pipe or receptacle, resulting in too little heat being transferred to the components with subsequent ice formation, frustrating the livestock's attempts to obtain water. Other problems that have plagued the designers of heated livestock watering assemblies have been; the freezing of the valve heat to the valve seat in the outlet section; unregulated pressurized water striking the livestock upon depression of the actuator lever; formation of ice on the surface of the trough or receptacle in exceptionally cold weather, imprisoning the actuator arm in the ice; and the disposition or construction of the actuator per se, such that even after the actuator has been depressed and water supplied to the trough, the actuator pesents an obstacle to the livestock attempting to gain access to the water. A further problem has been the accumulation of sediment, including feed from the animals' mouths, in livestock drinking receptacles.

The present invention was designed to eliminate these problems as will hereinafter be described.

SUMMARY OF THE INVENTION

An object of the present invention is the provision of a heated livestock watering assembly, which incorporates a variable flow water supply valve having a unique construction which allows the valve head to be tilted off or moved directly away from the valve seat in response to the force transmitted to the valve stem.

Another object of this invention is the provision of a heated livestock watering assembly which has a double acting actuator lever which vertically and horizontally translates the valve stem to provide a regulated flow to the drinking receptacle.

A further object is the provision of a heated livestock watering assembly which utilizes both insulation and heating elements disposed around the water supply pipe and drinking receptacle to prevent the formation of ice.

Still another object of the invention is the provision of a drinking receptacle and actuating element whose design is such that it is virtually impossible for the livestock to come into contact with the heated surfaces of the watering assembly, and which allows livestock access to the water contained in the receptacle even when the ambient temperature is below freezing.

A still further object of the invention is the provision of a heated watering assembly which is simple yet unique in construction, efficient in design, requires minimal force to operate, yet still provides a variable flow which is controlled by the livestock or by the level of water sensed by a float actuator.

Yet another object of the invention is the provision of a livestock watering assembly which is self-cleaning.

These and other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the freeze protected watering assembly of the instant invention.

FIG. 2 is a cross-sectional view of the watering assembly taken through line 2—2 of FIG. 1 illustrating the relationship of the elements which comprise the assembly.

FIG. 3 is a detailed cross-sectional view of the articulated valve head and plunger of the assembly.

DESCRIPTION OF THE PREFERRED EMBODIMENT

FIG. 1 illustrates a heated livestock watering assembly which is designated generally as 10. The assembly 10 comprises a vertical riser section 20, which houses a valve assembly 40, and supports a mounting bracket 50, which in turn pivotally supports a float actuator 60, and rigidly supports a water receptacle 80.

The insulated riser 20 comprises an upstanding hollow pipe section 21, which has insulation material 22 surrounding an axially disposed threaded water supply pipe 23. The insulated riser 20 extends into the ground below the freeze line, and is connected to a suitable water supply (not shown). A threaded elbow pipe 24 is secured to the water supply pipe 23 at one end, and supports the valve assembly 40 in an outlet section 25.

The outlet section 25 has a threaded exterior 26 which cooperates with pipe section 24, and an enlarged shoulder portion 27, which forms an abuttment surface whose purpose and function will be explained in conjunction with the support bracket 50. The outlet section 25 further comprises a reduced diameter internal shoulder portion 28 which forms a valve seat 29 on one side and a spring bearing surface on the other side.

The valve member 40 comprises an elongated valve stem 41 which extends through and beyond both ends of the outlet sections 25. The stem 41 comprises, an enlarged generally conically shaped portion 42 disposed adjacent its one end, an enlarged spring bearing surface 43 disposed proximate its mid-point, and a threaded reduced neck portion 44 which secures the valve head 45 to its other end. The valve head 45 comprises a gasket retaining cap member 46 which secures one side of a resilient valve gasket 47, and a tapered flow restricting element 48 which abuts the opposite side of gasket 47 and engages the shoulder portion of stem 41 formed by reduced neck portion 44. Both the resilient gasket 47 and tapered flow restricting element 48 are provided with suitably dimensioned apertures to accommodate the valve stem 41.

The valve member 40 is assembled in the outlet section 25 in the following manner: a tapered helical spring element 49 is inserted into the downstream portion of the outlet section so that the widest coil abuts against the internal shoulder 28; the valve stem 41 is inserted through the spring coils until the narrowest coil abuts against the bearing surface 43; the spring 49 is then compressed to project the reduced neck portion 44 beyond the upstream end of the outlet section 25; the flow restricting element 48 is then inserted on the valve stem 41 until it engages the shoulder formed by the reduced neck portion 44; the resilient gasket is inserted onto the valve stem 41 until it abuts element 48 and then the gasket retaining cap member 46 is threaded onto the valve stem to secure the gasket and complete the assembly.

As can be seen by reference to FIG. 2, the outlet section 25, supports the valve assembly 40 so that it projects through suitably dimensioned apertures in both the riser 20 and the support bracket 50. The riser 20 is additionally provided with an end cap member 30, to prevent water from entering the interior of the riser and reducing the efficiency of the insulating material contained therein.

The support bracket 50 comprises an external frame 51 which partially surrounds an internal contoured splash guard member 52. The external frame 51 has an aperture 55 disposed therein whose diameter is greater than the diameter of the enlarged shoulder portion 27 of the outlet section 25. The internal splash guard 52 has an aperture 56 disposed therein whose diameter is less than the diameter of the enlarged shoulder portion 27.

The support bracket 50 is affixed to the riser 20 via suitable securing means 53. In the assembled relationship, the internal splash guard 52 abuts the enlarged shoulder 27 of the outlet section, and the outlet is secured to the support bracket 50 via a locking nut 54. A float actuator 60 is pivotally secured to the support bracket 50 as at 57, and a water receptacle 80 is rigidly suspended from the bracket 58.

The float actuator 60 comprises a pivoted float arm 61 having a horizontally disposed actuator element 63 positioned adjacent a portion of the valve stem 41 and a vertically disposed actuator element 64 spaced from the valve stem 41. TTe free end of the float arm 61 is rigidly secured to an insulated float member 65 having an aperture 66 centrally disposed therein. The float 65 is bowl shaped in configurations, and comprises a hollow plastic shell 67 filled with insulating material 22. The float 65 is further provided with a recessed portion 68 which allows the float arm 61 to be depressed to the point where the arm 61 comes into contact with the splash guard 52.

Suspended beneath the float 65 is the water or drinking receptacle 80 which is rigidly fastened to the support bracket 50 by suitable securing means. The drinking receptacle 80 comprises an outer plastic shell 81, which surrounds and partially encompasses an inner metallic bowl 82. The hollow space formed by the interiors of the shell 81 and bowl 82 is filled with insulating material 22 and contains a heating element 83. The bowl 82 conforms to a portion of the interior of the shell 81, and the heating element 83 surrounds, and is in intimate contact with the periphery of the metallic bowl 82. The heating element 83 comprises one or more electrical heating wires 84 surrounded by electrical insulation material which prevents an electrical shock from being transmitted via the metallic bowl to the water in the receptacle and subsequently to any livestock coming into contact with the water.

The plastic shell 81 only partially extends into the water containing portion of the receptacle 80, and the metallic bowl 82 essentially defines the capacity and configuration of the water containing portion of the receptacle 80. The purpose of the overlapping portion of the shell 81 and bowl 82 is to prevent direct contact by the animal with the heated surface of the metallic bowl 82. Since the heating element 83 conducts heat through the surface of the metallic bowl 82, and since warm water rises to the surface, it is only necessary for the lower portions of the bowl 82 to be in direct contact with the water to prevent ice forming on the ring-shaped surface of the water in receptacle 80. It is observed that the instant structure by exposing only this ring-shaped surface to the subfreezing temperatures, consumes much less energy in maintaining the water in receptacle above freezing. In addition, the fact that the exposed surface is surrounded along its outer perimeter by the insulated receptacle 80, and has at this center the insulated circular float 65 facilites the energy efficiency of the structure, and minimizes the electrical energy required to prevent freezing.

The exterior of the float 65 and the interior of the bowl 82 have downwardly relatively diverging surfaces which cooperate to supply unfrozen water to the interior of the float 65. As is shown in FIGS. 1 and 2, the structure is designed so that the water level normally comes only to the top 62 of aperture 66 when the float 65 is in the undepressed, or resting, position. Consequently, in order to drink water, the animal must, normally depress the float. As the float 65 is depressed by the muzzle of an animal, the aforementioned surfaces converge forcing water through the aperture 66 and into the interior of the float. The fact that the heated water directly underlies and is contiguous with any water in aperture 66, prevents freezing within the aperture 66. Moreover, if ice does form within aperture 66 or upon water in the interior of float 65, depression of the float by the animal will force water around the ice.

The normal operation of the device entails the use of the heating element during freezing temperatures to prevent the formation of ice, and the heating element obviously can be disengaged during moderate temperatures.

The angle of float actuator arm 61 controls the supply of water to the drinking receptacle 80 either in response to the water level in the receptacle, or in response to the degree of depression of the actuator arm 61 by the force exerted on the float 65 by the muzzle of an animal.

As can best be seen by reference to FIGS. 2 and 3 the actuator arm 61 has a vertically disposed actuator element 64 positioned adjacent to the valve stem 41. The element 63 is disposed above and cooperates with the enlarged portion 42 of the stem 41, and the element 64 is disposed opposite and cooperates with the end of the stem 41.

Since the spring 49 is the sole support for the valve assembly 40 in the outlet section 25, the valve head 45 may be tilted off the valve seat 29 or laterally displaced, completely away from the valve seat, depending on the direction of the force exerted on the valve stem.

When the actuator lever 61 is depressed by a downward movement of the float 65, the horizontally disposed actuator element 63 contacts the enlarged portion of the valve stem and tilts the valve head off one side of the valve seat, allow a restricted flow of water to the drinking receptacle. Continued downward movement of the lever 61 brings the vertically disposed actuator element 64 into contact with the end of the valve stem and drives the valve head laterally away from the valve seat. Since the valve head has a tapered flow restricting element 48 positioned downstream of the valve seat 29 the volume of flow through the outlet will increase in proportion to the distance that the valve head has been laterally displaced from the valve seat. The first actuating element 63 provides a uniform low volume flow, and the second actuating element progressively increases the volume of flow.

It is additionally observed that the instant livestock watering assembly has self-cleaning capabilities. Normally, livestock drinking receptacles must be cleaned regularily inasmuch as sediment, including feed from animals' mouths, collects within them. Moreover, if the sediment is permitted to lie motionless, it will adhere to interior walls, making it more difficult to clean the receptacle. The present invention reduces this problem by providing primarily two cooperating self-cleaning features. First, when an animal depresses float 65, and thereby forces water through aperture 66 as aforedescribed, the accelerated stream water through aperture 66 produces a vacuum force within receptacle 80 which stirs up any sediment, drawing it along with the water stream through the aperture 66. Second, as the float 65 is depressed, and the float arm 61 moves closer to splash guard 52, the passage for the flow of water into the receptacle 80 becomes constricted. The closer the arm 61 is to the guard 52 the greater the flow passage constriction, and also the greater the flow of water through the valve assembly 40. Consequently, the further the float 65 is depressed, the greater the velocity of the water flow into the receptacle 80. This high speed incoming water flow stirs up any sediment in the receptacle so that it can be carried into float 65 through aperture 66. Additionally, by stirring the sediment, the incoming flow helps to prevent adherence of the sediment to the interior walls of receptacle 80. It can, therefore, be understood that both the vacuum effect caused by aperture 66, and the accelerated flow into the receptacle 80 work together to prevent the sediment from adhering to receptacle 80, or collecting within it.

It should thus be appreciated that a watering device constructed in accordance with the teachings described herein will result in a freeze proof automatic watering device which varies the volume of water supplied to the drinking receptacle in response to the degree of depression experienced by the unique actuating mechanism and valve assembly described; the watering device further having self-cleaning capabilities.

Having thereby disclosed the subject matter of this invention, it should be obvious that many modifications, substitutions and variations of the invention are possible in light of the above teachings. It is therefore to be understood, that the invention may be practiced other than as specifically described, and should be limited only by the breadth and scope of the appended claims.

What we claim is:

1. An animal watering device having an exterior housing, a water supply pipe disposed in said housing, insulation disposed within said housing about said pipe, and a valve assembly disposed in the outlet portion of said water supply pipe and operatively engageable by an actuator means to supply water to a drinking receptacle disposed beneath said valve assembly, the improvement comprising:

an insulated apertured bowl shaped float member supported on a free end of said actuator means and substantially overlying said insulated drinking receptacle, wherein said bowl shaped float member floats upon water contained in said drinking receptacle, and said bowl shaped float member is adapted to be moved by direct contact from an animal to introduce water into the interior of said float member, wherein the water may be consumed by said animal from the interior of said insulated apertured bowl shaped float member and said drinking receptacle is further provided with heating means comprising an electrical heating wire surrounded by electrical insulation material, and said drinking receptacle includes an inner metallic bowl to heat said metallic bowl, said metallic bowl transferring heat to water contained within said bowl.

2. The animal watering device as in claim 1, wherein:
the interior of the drinking receptacle and the exterior of the float member have downwardly diverging surfaces.

3. An animal watering device having an exterior housing, a water supply pipe disposed in said housing, insulation disposed within said housing about said pipe, and a valve assembly disposed in the outer portion of said water supply pipe and operatively engageable by an actuator means to supply water to a drinking receptacle disposed beneath said valve assembly; the improvement comprising:

a bowl shaped float member secured to a free end of said actuator means wherein said bowl shaped float member floats upon water contained within said drinking receptacle, said bowl shaped float member including a centrally disposed aperture, said aperture providing for fluid communication between said bowl shaped float member and said drinking receptacle, said bowl shaped float member moveable in response to the water level in the drinking receptacle to introduce water into said receptacle, and moveable in response to direct contact from an animal to introduce water into the interior of said bowl shaped float member comprising a drinking bowl, wherein said bowl shaped float member has an undepressed position and a depressed position, and wherein, when said bowl shaped float member is in said undepressed position, the water from said drinking receptacle, which is contained in said aperture, does not rise above the top of said aperture.

4. The animal watering device of claim 3, wherein the valve assembly comprises,
a valve head and valve seat disposed in the upstream end of the outlet portion, and
an elongated valve stem, disposed in the downstream end, and projecting from, the outlet portion.

5. The animal watering device of claim 4, wherein;
the elongated valve steam is resiliently supported in the downstream end of the outlet portion, and
adapted to be engaged by said plurality of means disposed of said actuator element.

6. The animal watering device of claim 5, wherein;

the resilient support for said valve stem is a helical spring which tiltably suspends said valve stem in said outlet portion.

7. The animal watering device as in claim 6, wherein, the first of said plurality of means is horizontally disposed on the actuator element, and is adapted to engage the valve stem to tilt the valve head on the valve seat.

8. The animal watering device as in claim 7 wherein; the second of said plurality of means is vertically disposed on the actuator element, and is adapted to engage the valve stem to move the valve head laterally away from the valve seat.

9. The animal watering device as in claim 8, wherein; the engagement of said plurality of means with the valve stem is sequential.

10. The animal watering device as in claim 9, wherein; said valve head is provided with a rearwardly tapered portion which projects through the valve seat.

11. The animal watering device as in claim 10, wherein; said heating means comprises an electrical heating wire surrounded by electrical insulation material, and said drinking receptacle includes an inner metallic bowl, said heating wire encircling said metallic bowl to heat said metallic bowl, said metallic bowl transferring heat to water contained within said bowl.

12. The animal watering device of claim 1 or 3, further comprising a self-cleaning means for preventing sediment from collecting within said drinking receptacle and adhering to an interior surface of said drinking receptacle.

13. The animal watering device of claim 12 wherein said self-cleaning means comprises said aperture in said bowl-shaped float member.

14. The animal watering device of claim 13 wherein said self-cleaning means further comprises an accelerating means for accelerating an incoming stream of water into said drinking receptacle.

15. The animal watering device of claim 14 wherein said accelerating means comprises a constrictable flow passage, said constrictable flow passage being defined by a splash guard disposed above said drinking receptacle and an underside of said actuator element.

* * * * *